Jan. 8, 1963

G. A. MOSITES 3,072,139

VALVES

Filed Nov. 12, 1959

INVENTOR
George A. Mosites

BY *Walter J. Jaymin*

ATTORNEY

Jan. 8, 1963    G. A. MOSITES    3,072,139
VALVES
Filed Nov. 12, 1959    2 Sheets-Sheet 2

INVENTOR
George A. Mosites
BY
ATTORNEY

United States Patent Office 3,072,139
Patented Jan. 8, 1963

3,072,139
VALVES
George A. Mosites, P.O. Box 2115, Fort Worth, Tex.
Filed Nov. 12, 1959, Ser. No. 852,259
11 Claims. (Cl. 137—375)

This invention relates to valves and more particularly to valves of the butterfly type.

An object of the invention is to provide a new and improved valve for controlling the flow of fluids through a flow conductor.

Another object of the invention is to provide a valve which is easily connectible in a flow conductor to control the flow of fluids therethrough.

Still another object of the invention is to provide a valve body connectible between adjacent flanged ends or flange fittings of a conductor.

A further object of the invention is to provide a valve of the butterfly valve type having a body which is easily connectible to flange fittings of a flow conductor and has apertures for receiving at least a pair of connecting means or bolts of the flange fitting for properly positioning the valve body between the flange fittings prior to the fluid tight connection of the valve body between the flange fittings.

A still further object is to provide a valve having seal means for sealing between the body and the flange fittings on opposite sides of the body.

Another object of the invention is to provide a valve of the butterfly type wherein the valve body and the flapper or disk for closing the flow passage through the body are protected from contact with the fluids whose flow the valve controls by a seat means whereby the valve may be used to control the flow of corrosive fluids.

Still another object is to provide a valve having a valve body in whose flow passage is disposed a disk mounted on a shaft which extends perpendicularly through the flow passage and through the valve body to the exterior thereof wherein the disk and the valve body are provided with protective means which prevent access of the fluids flowing through the valve to the disk shaft.

A further object of the invention is to provide a valve body having a flow passage protected by a resilient seat means, the body having opposed openings communicating with the flow passage, a disk disposed in the flow passage, and a shaft extending through the body wherein the disk and the body are provided with protective means at points of contact whereby the shaft is not exposed to the fluids flowing through the flow passage.

A still further object of the invention is to provide a valve wherein the seat means of the valve body adjacent the openings and engageable by the valve disk provides parallel spaced surfaces, engageable by opposite edges of the valve disk adjacent the shaft, which are spaced apart a distance smaller than the diameter of the opening of the flow passage whereby the disk and the protective means form a fluid-tight seal therebetween regardless of the position of the valve disk in the flow passage.

A still further object of the invention is to provide a valve body wherein the valve disk is provided with spherical protuberances engageable in correspondingly shaped recesses in the protective covering of the valve body in alignment with the shaft to provide a fluid-tight seal between the valve disk and the valve body.

Additional objects and advantages of the invention will be readily apparent from the reading of the following description of a device constructed in accordance with the invention, and reference to the accompanying drawings thereof, wherein.

Figure 1:
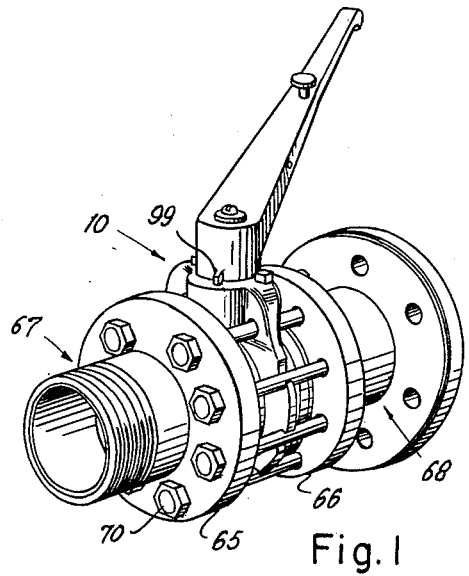
FIGURE 1 is a perspective view of the valve embodying the invention showing it connected to a pair of flange fittings of a flow conductor.
Figure 3:
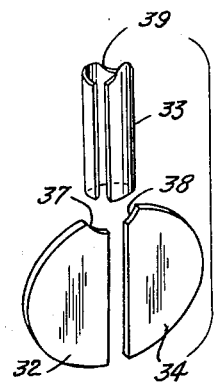
FIGURE 3 is an exploded view of the valve disk.
Figure 2:
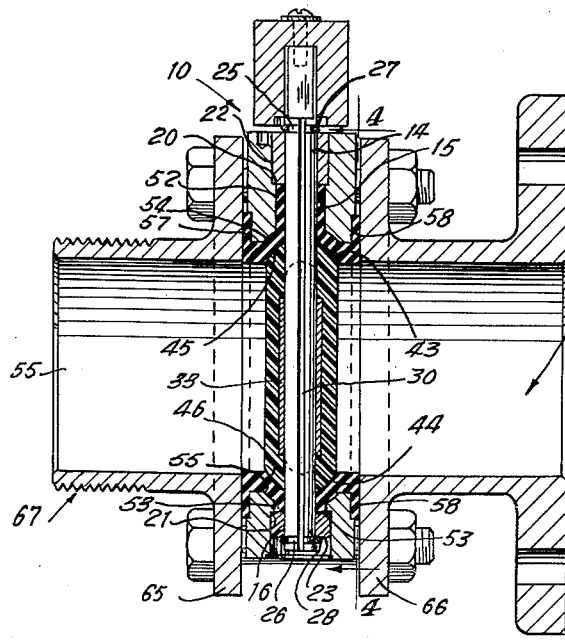
FIGURE 2 is a vertical sectional view of the valve showing the valve disk in closed position disposed perpendicularly to the direction of flow of fluids therethrough.
Figure 4:
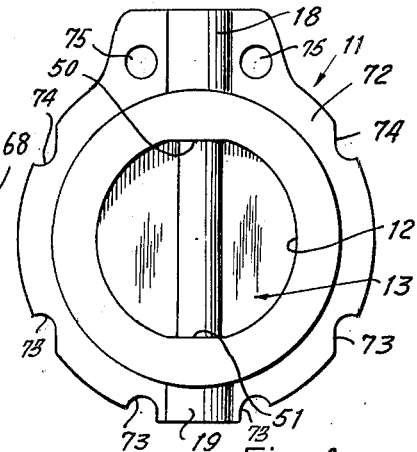
FIGURE 4 is a view taken on line 4—4 of FIGURE 2.

Referring now to the drawings, the valve 10 includes a body 11 provided with a longitudinal flow passage 12 in which is disposed a valve disk 13. The valve disk is secured to the valve shaft 14 which extends through the flow passage of the valve perpendicularly relative to the central axis of the flow passage and through a pair of aligned shaft openings 15 and 16 of the valve body. The valve body may be provided with enlargements 18 and 19 which provide the shaft openings 15 and 16, respectively. The shaft openings 15 and 16 are enlarged to provide oppositely facing annular stop shoulders 20 and 21, respectively, which are adapted to be abutted by the bearing sleeves 22 and 23 through which the shaft 14 extends. The shaft is provided outwardly of the bearing sleeves with external annular recesses 25 and 26 in which are disposed the lock rings 27 and 28, respectively, for locking the shaft against longitudinal movement relative to the bearing sleeves and the valve body.

The shaft is provided with a longitudinal recess or groove 30 in which is receivable the inner edge portion 31 of the semi-circular disk member 32 of the valve disk which extends through the gap between the adjacent ends of the split sleeve 33 and is rigidly secured thereto in any suitable manner, as by a weld. A similarly oppositely disposed disk member 34 has its inner linear edge portion abutting the exterior of the split sleeve opposite the split thereof and is rigidly secured thereto by any suitable means, as by welds. It will be apparent that the longitudinal groove of the shaft 14 and the inner edge portion 31 of the disk member 32 form a tongue and groove connection which holds the valve disk 13 non-rotatably on the shaft.

If desired, the upper portions of the disk members 32 and 34 of the split sleeve may be cut away arcuately, as at 37, 38 and 39, respectively. The disk members and the split sleeve 33, when rigidly secured together, are provided with a protective covering of a suitable plastic or rubber which is non-corrodible or does not react with the fluid whose flow the valve is to control and which forms a relatively rigid protective covering or sheath 40.

The protective covering 40 is formed with integral semi-spherical protuberances or seats 43 and 44 disposed outwardly of the split sleeve which are received in the concave recesses 45 and 46, respectively, of the resilient protective seat 49 which covers the cylindrical inner surface of the body. The concave recesses 45 and 46 are formed in th longitudinally extending flat surfaces 50 and 51, respectively, of the seat 49. The concave recesses may be of smaller radius than the outer radius of the protuberances so that the latter will stretch the resilient substance forming the seat 49 to effect a fluid-tight seal therewith when inserated into the concave recesses. The seal 49 has cylindrical extensions 52 and 53 disposed in the shaft openings 15 and 16, respectively, of the body and aligned with the concave recesses whereby the portions of the shaft extending outwardly of the valve disk are engaged by the resilient cylindrical sections 52 and 53 through which the shaft extends. Such cylindrical extensions of the seat 50 seal between the shaft and the valve body. The body adjacent the shaft openings 15 and 16 has annular recesses 54 and 55, respectively, which conform to the configuration of the concave recesses 44 and 45, of the seat.

The protective covering also has integral annular flanges 57 and 58 which extend on opposite sides of the valve body and are disposed in annular recesses 59 and 60 thereof. The annular recesses are defined by inwardly facing shoulders 61 and 62, respectively, which limit outward movement of the resilient flanges 57 and 58 on the body and by the annular surfaces 61a and 61b which extend perpendicularly relative to the central axis of the flow passage of the body. The protective seat and its integral cylindrical extensions and flanges are bonded to the valve body in any suitable manner as by moulding them on the valve body with a vulcanizing adhesive system. The flanges 57 and 58 extend outwardly of the outer sides 63 and 64 of the valve body so that they may be compressed against the valve body by the flanges 65 and 66, respectively, of the flange fittings 67 and 68, respectively.

The cylindrical seat 50 is engaged by peripheral portions of the disk and yields to form an annular recess 69 in which such peripheral portions of the disk are received when the disk is in the closed position illustrated in the drawing.

The valve is secured between the annular flanges 65 and 66 of the flange fittings 67 and 68, respectively, by a plurality of bolts 70 which extend through aligned circumferentially arranged apertures in the flanges 65 and 66. The valve body has an external reinforcing rib 72 which extends about the valve body and is integral with the enlargements 18 and 19 of the valve body 11. The reinforcing rib is provided with a plurality of downwardly opening recesses 73 through which the lower four bolts 70 may extend and with a pair of upwardly opening recesses 74 through which an intermediate pair of bolts 70 may extend. The rib adjacent the enlargement 18 is provided with a pair of guide or positioning apertures 75 through which the uppermost pair of bolts 70c may extend. The positioning apertures 75 are provided to act in conjunction with the two uppermost bolts 70c as aligning or centering means to properly position the valve body with respect to the apertures of the flanges 65 and 66 so that the intermediate bolts 70b may easily be extended through the recesses 74 during installation of the valve between the flange fittings 67 and 68 and to position the flow passage of the body in alignment with the bores of the flange fittings as will be described more fully below.

The valve disk 13 is movable, between the fully closed position illustrated in the drawings and its fully open position wherein the valve disk is rotated 90 degrees about the axis of the shaft 14, by a handle 80 rigidly secured to the upper reduced end of the shaft 14 by a screw 81 which extends into a threaded bore in the upper end of the shaft. The internal bore 82 through which the reduced portion of the valve disk shaft extends is reduced to provide a flat surface 82 which is abutted by a flat surface 83 of the reduced end portions of the shaft to prevent rotation of the handle relative to the shaft. The handle is provided with a locating pin 85 which is receivable in the locating holes 86 provided in the valve body for positioning the valve disk in predetermined angular positions in the flow passage. The pin is slidably mounted in vertical apertures parallel to the axis of the shaft and is movable out of the locating holes 86 by a lever 87 pivotally mounted in the channel shaped handle by means of a pivot pin 88 which extends through the webs of the handle. The lever 87 is biased downwardly to urge the pin into a locating hole by a spring 90 whose upper end bears against the handle and whose lower end extends into slots 91 of the lever 87 to bear thereagainst. The reduced free end of the lever 87 is received in a suitable transverse slot of the locating pin. The opposite end of the lever is received in a downwardly opening slot 92 of a button 93 whose head extends above the handle. The button 93 is provided with a cotter key 95 disposed below the lever 87 to retain the button thereof.

The handle has an outwardly extending lug 99 which is engageable by the upwardly extending studs 100 and 101 of the body which limit the rotation of the shaft and of the valve disk to 90 degrees.

The valve is assembled by inserting the valve disk 13 into the valve body, the protective seat being resilient distorts to permit the insertion of the valve disk into the flow passage of the valve body and into the position wherein the semi-spherical or convex seats 43 and 44 are disposed in the concave opposed recesses 45 and 46 of the seat. The lock ring 27 is inserted into the recess 25. The shaft 14 is then inserted through the upper bearing sleeve 22 and through the split sleeve 33 of the disk valve into and through the lower bearing sleeve 21. The lock ring 28 is then inserted in the annular recess 26 to lock the shaft against withdrawal from the valve body.

It is then desired to install the assembled valve between the flanges 65 and 66 of the flange fittings 67 and 68, the bolts 70 which secure the two flange fittings together are loosened to spread the flanges apart. The intermediate bolts 70b and the uppermost bolts 70c are removed entirely. The valve is then inserted between the flanges 65 and 66 and the bolts 70c are then inserted through the aligned upper pair of apertures of the flanges 65 and 66 and through the upper guide or positioning apertures 75 of the valve body to hold the valve body properly positioned between the flanges. At this time the lower bolts 70a are received in the downwardly opening slots 73 of the reinforcing rib 72 of the valve body. The bolts 70b are then inserted through the intermediate aligned apertures of the flanges 65 and through the upwardly opening recesses 74 of the rib. The valve body is thus held in properly aligned position between the two flanges 65 and 66 by the upper two bolts due to the provision of the guide or aligning apertures 75 which extend through the valve body. The bolts are then tightened. Such tightening of the bolts causes the flanges to abut the annular flanges 57 and 58 of the protective seat of the valve body whereby a fluid-tight seal between the valve body and the flange fittings is obtained. Since the resilient annular flanges of the protective sheath extend outwardly of the side surfaces of the body even when compressed, the flanges 65 and 66 do not contact the valve body itself. The flange fittings are of course connected to the conduit or pipe sections of the flow conductor. The valve then controls flow of fluids through its flow passage and through such flow conductor.

The semi-spherical protuberances or seats 43 and 44 are now in fluid tight engagement with the concave surfaces or seats 45 and 46 of the seat 49 of the valve body so that no fluids, which flow through the valve body, may pass therebetween to attack the metal shaft 14 or the bore of the valve body itself. The uppermost and lowermost edges of the valve disk abut and are embedded in the flat surfaces 50 and 51, which extend on either side of the concave recesses 45 and 46, when the valve disk is moved to a fully open position to further compress the resilient protective covering or sheath 50 into fluid tight engagement with the substantially semi-spherical surfaces 43 and 44 since they are spaced apart a distance smaller than the diameter of the valve disk when the valve disk is in its fully open position. It will of course be apparent that when the disk is in its fully closed position, or in a partly closed position, greater areas of the periphery of the valve disk are in engagement with the protective covering or sheath to force the adjacent portions of the protective sheath in tighter compressive engagement with the concave surfaces or seats 43 and 44 of the valve disk. It will thus be apparent that due to the provision of the flat surfaces there is a tight compressive engagement between the convex surfaces of the valve disk and the concave surfaces of the seat 49 regardless of the operative position of the valve disk in the valve body and any flow of fluids from the flow passage between the valve disk and the resilient seat 40 to the shaft itelf is prevented. The covering or sheath 40 of the disk and the resilient seat 49 are formed of substances which are not affected by the particular fluid whose flow the valve is to control.

It will now be seen that the new and improved valve includes a tubular valve body having a protective covering forming a seat 49 which protects the valve body from contact with the fluids flowing therethrough and a valve disk mounted in the flow passage of the valve body and pivotable about a transverse axis of the body by a shaft which extends through the valve disk and the valve body and has an upper end which is provided with a handle.

It will further be seen that the valve disk has convex protuberances or seats 43 and 44 received in concave recesses of the seat 49 of the valve body to effect a fluid-tight seal between the valve disk and the valve body which prevents contact of the fluid in the flow passage of the valve with the shaft whereby the shaft is protected against corrosion by the fluids whose flow is controlled by the valve.

It will further be seen that the seat 49 has radially outwardly extending annular flanges on the side of the valve body to engage the flanges of suitable fittings 67 and 68, by means of which the valve is connected in a flow conductor, to seal between the flange fittings of the valve body.

It will further be seen that the valve body is provided with a pair of aligning or positioning apertures 75 through which the pair of upper bolts 70c may be inserted to align or position the valve body in proper position between the valve flange fittings so that the flow passage of the valve body is in axial alignment with the bores of the valve fittings.

It will further be seen that the flanges of the body are provided with circumferentially spaced recesses in which are receivable intermediate portions of the bolts 70a and 70b which connect the flanges of the flange fittings together to secure the valve body between the flange fittings and to place the resilient lateral flanges of the seat 49 under compression to effect a fluid-tight seal therebetween.

It will further be seen that the valve may be removed from between the flange fittings, by merely loosening the bottom four bolts and removing the upper four bolts, for repairs or replacement and that the repaired valve or a new valve may be installed between the flange fittings by merely lowering the valve body between the flange fittings while the lower four bolts remain in place and then inserting the two topbolts 70c through the aligning or positioning apertures 75 of the peripheral rib of the valve body and through the two top aligned apertures of the valve fittings to properly align the flow passage of the valve body with the bores of the flange fittings.

It will further be seen that the valve disk is formed of a split sleeve and a pair of semi-cyclindrical disk members, one of which extends through the longitudinal slot of the split sleeve to form a tongue which is insertable in the longitudinal groove of the shaft to prevent rotation of the disk relative to the shaft.

It will further be seen that a valve 10 which is easily connectible in a flow conductor has been illustrated and described which may be used to control the flow of even the most highly corrosive fluids since none of the metal portions of the valve are contactable by the fluid whose flow the valve controls since the valve disk and the protective seat of the valve body have arcuate seal surfaces which prevent flow of fluids therebetween to the metal portions such as the shaft or the valve body.

It will further be seen that the protective coating or seat 49 covers the cyclindrical flow passage and has flat portions spaced apart a distance smaller than the diameter of the flow passage whereby end arcuate peripheral portions of the valve disk compress the concave seats of the resilient protective seat into tight engagement with the convex protuberances of the valve disk when the valve disk is moved to an open position in which intermediate portions of the peripheral surfaces of the valve disk are out of engagement with the protective covering or seat 49 which would otherwise be relieved of compressional forces which tend to hold the concave seal surfaces of the protective seat in tight pressure contact with the convex seal surfaces of the valve disk.

It will further be seen that the convex seal surfaces 43 and 44 of the valve disk extend outwardly in opposite directions of the outer periphery of the valve disk into concave recesses of the protective covering or seat which provides the concave seal surfaces.

Figures 5, 6, 7, 8:
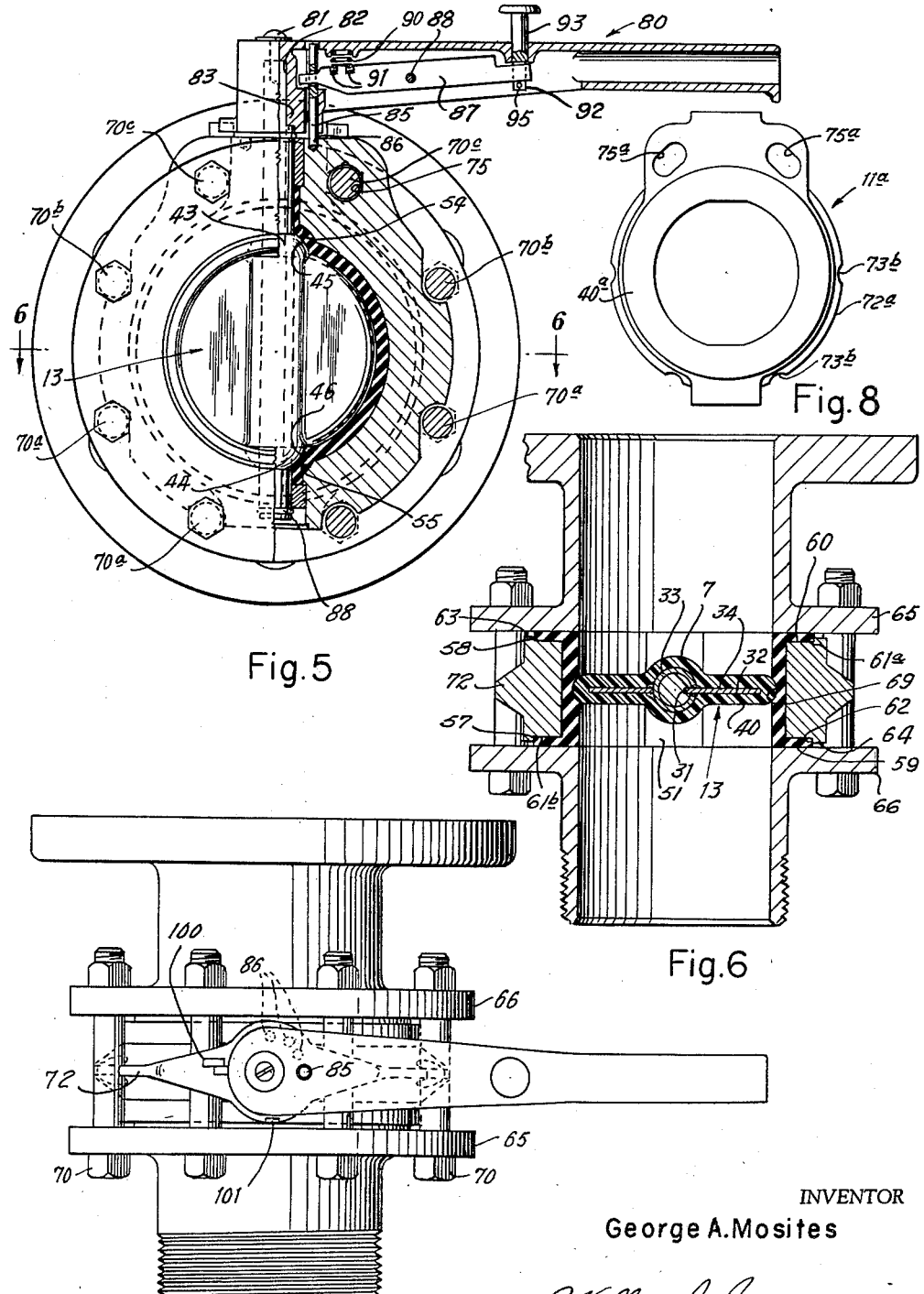
FIGURE 5 is a vertical, partly sectional view of the valve showing the valve disk in closed position.
FIGURE 6 is a sectional view taken on line 6—6 of FIGURE 5.
FIGURE 7 is a top view of the valve.
FIGURE 8 is a front view of a modified form of the body for the valve.

In FIGURE 8 is illustrated a modified form of the valve body wherein the valve body 11a is adapted for use with flange fittings provided with either six or eight fastening bolts. The reinforcing rib 72a of the valve body 11a is of such outer diameter that the bolts of eight bolt type flange fittings will be disposed outwardly of the reinforcing ribs while the bolts of the six bolt type flange fittings will be received in the recesses 73b provided in the reinforcing rib 72a. The positioning apertures 75a are elongated and extend convergently upwardly whereby the bolts of six bolt flange fittings will be received in the lower portions of the positioning apertures. The bolts of eight bolt flange fittings, such as the flange fittings illustrated in FIGURES 5 and 6, will be received in the upper portions of the elongated positioning apertures 75a. The valve body will be held between such valve fittings in proper alignment therewith by such upper two bolts.

The valve body 11a corresponds in every other particular with the valve body 11 and have the protective sheath 40a. It will thus be seen that the valve body 11a may be employed if the valve is to be selectively positionable in flow conductors having either eight bolt or six bolt flange fittings.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve including: a tubular body having a flow passage; a resilient protective seat member covering the interior of said tubular body and having portions extending outwardly on opposite sides of said body; a valve disk mounted in said flow passage for rotation about an axis perpendicular to the central axis of said flow passage and engageable with the protective seat member, said valve having a shaft extending radially through said body and through said valve disk, said valve disk having protuberances providing convex seat surfaces extending outwardly from said shaft, said protective covering having inwardly facing concave seal surfaces engageable with said convex seat surfaces of said valve disk for sealing therebetween to prevent flow of fluids to the shaft from said flow passage, said protuberances, said convex seat surfaces, and said concave seal surfaces having a common central axis, said central axis also being the longitudinal axis of said shaft, said concave seal surfaces of said protective covering having radii of curvature, when said protuberances are not engaged with said concave seal surfaces, which are smaller than the radii of curvature of said convex seat surfaces whereby a fluid tight seal between said surfaces is ensured when the valve disk is mounted in said flow passage, said valve disk being non-rotatably secured to said shaft.

2. A valve including: a tubular body having a flow passage; a resilient protective seat member covering the interior of said tubular body and having portions extending outwardly on opposite sides of said body, a valve disk mounted in said flow passage for rotation about an axis perpendicular to the central axis of said flow passage and engageable with the protective seat member, said valve having a shaft extending radially through said body and through said valve disk; said valve disk having protuberances providing convex seat surfaces extending outwardly of said shaft, said protective covering having inwardly facing concave seal surfaces engageable with said convex seat surfaces of said valve disk for sealing therebetween to prevent flow of fluids to the shaft from said flow passage, said protuberances, said convex seat surfaces, aand said concave seal surfaces having a common central axis, said central axis also being the longitudinal axis of said shaft, said protective covering being provided with a pair of cylindrical extensions disposed about said shaft and between said body and said shaft outwardly of said protuberances, said concave seal surface of said protective covering having radii of curvature, when said protuberances are not engaged with said concave seal surfaces, which are smaller than the radii of curvature of said convex seat surfaces whereby a fluid tight seal between said surfaces is ensured when the valve disk is mounted in said flow passage; said shaft extending outwardly of said body; and means secured to said shaft for rotating such shaft, said valve disk being non-rotatbly secured to said shaft.

3. A valve including: a tubular body having a flow passage; a resilient protective seat member covering the interior of said tubular body and having portions extending outwardly on opposite sides of said body; a valve disk mounted in said flow passage for rotation about an axis perpendicular to the central axis of said flow passage and engageable with the protective seat member, said valve having a shaft extending radially through said body and through said valve disk; said valve disc having protuberances providing convex seat surfaces extending outwardly of said shaft, said protective covering having inwardly facing concave seal surfaces engageable with said convex seat surfaces of said valve disk for sealing therebetween to prevent flow of fluids to the shaft from said flow passage, said protuberances, said convex seat surfaces, and said concave seal surfaces having a common central axis, said central axis also being the longitudinal axis of said shaft, said concave seal surfaces of said protective covering having radii of curvature, when said protuberances are not engaged with said concave seal surfaces, which are smaller than the radii of curvature of said convex seat surfaces whereby said protective covering is compressed against said body and said shaft by said protuberances when said valve disk is mounted in said flow passage to ensure a fluid tight seal between said surfaces, said valve body having annular recesses; outwardly extending flanges of said protective seat member being disposed in said annular recesses and extending longitudinally outwardly therefrom.

4. A valve including: a tubular body having a flow passage; a resilient protective seat member covering the interior of said tubular body and having portions extending outwardly on opposite sides of said body; a valve disk mounted in said flow passage for rotation about an axis perpendicular to the central axis of said flow passage and engageable with the protective seat member, said valve having a shaft extending radially through said body and through said valve disk; said valve disk having protuberances providing convex seat surfaces extending outwardly of said shaft, said protective covering having inwardly facing concave seal surfaces engageable with said convex seat surfaces of said valve disk for sealing therebetween to prevent flow of fluids to the shaft from said flow passage, said protuberances, said convex seat surfaces, and said concave seal surfaces having a common central axis, said central axis also being the longitudinal axis of said shaft, said concave seal surfaces of said protective covering having radii of curvature, when said protuberances are not engaged with said concave seal surfaces, which are smaller than the radii of curvature of said convex seat surfaces whereby said protective covering is compressed against said body and said shaft by said protuberances when said valve disk is mounted in said flow passage to ensure a fluid tight seal between said surfaces; said shaft extending outwardly of said body; and means secured to said shaft for rotating such shaft, said valve body having annular recesses; said outwardly extending flanges of said protective seat member being disposed in said annular recesses and extending longitudinally therefrom.

5. A valve connectible in a flow conductor between fittings thereof having opposed flanges and a plurality of circumferentially spaced securing means connecting said flanges including: a valve body; a valve disk mounted in said body to control flow thereto; a protective seat member having a cylindrical portion engageable by the valve disk and radially extending outer flanges disposed on opposite sides of said body for engagement with the flanges of the fittings to provide a fluid tight seal therebetween, said body having a pair of guide openings for receiving said securing means to position the body properly between said flanges during installation of the valve body therebetween; said valve disk having protuberances providing convex seat surfaces, said protective seat member having inwardly facing concave seal surfaces engageable with said convex seat surfaces of said valve disk for sealing therebetween; said protective seat member having a pair of opposed flat surfaces, said flat surfaces being adjacent said concave seal surfaces and being spaced apart a distance smaller than the diameter of the cylindrical portion thereof engageable by peripheral portions of said disk valve for maintaining said resilient cylindrical portion adjacent said concave recesses under predetermined compressional forces when said disk member is in any of its open positions, said protruberances, said convex seat surfaces, and said concave seal surfaces having a common central axis, said central axis also being the longitudinal axis of said shaft.

6. A valve including: a tubular body having a flow passage and a pair of opposed shaft openings communicating with said flow passage; a resilient protective seat member covering the interior of said tubular body and having portions extending outwardly on opposite sides of said body; a valve disk mounted in said flow passage for rotation about an axis perpendicular to the central axis of said flow passage and engageable with the seat member, said valve having a shaft extending through said body and said protective member and through said shaft openings of said body, said valve disk being secured to said shaft against rotation thereabout, said valve disk having protuberances providing convex seat surfaces curving outwardly from said shaft, said protective covering having a pair of opposed flat surfaces spaced apart a distance smaller than the internal diameter of said protective seat member and having concave recesses providing concave seal surfaces engageable with said convex seat surfaces of said valve disk for sealing therebetween to prevent flow of fluids to the shaft from said flow passage, said flat surfaces being adjacent said concave seal surfaces, said opposed flat surfaces of said protective seat member being engageable by peripheral portions of said disk valve adjacent said protuberances for maintaining said protective seat member adjacent said concave recesses under predetermined compressional forces when said valve disk is in any of its open positions, said protuberances, said convex seat surfaces, and said concave seal surfaces having a common central axis, said central axis also being the longitudinal axis of said shaft.

7. The valve of claim 6 wherein said protective covering is provided with a pair of cylindrical extensions extending into said shaft openings for sealing between said shaft and said body outwardly of said protuberances.

8. The valve of claim 6 wherein said valve disk comprises a cylindrical member having means provided with a longitudinal slot; semi-circular members extending radially outwardly in opposite directions from said cylindrical sleeve and rigidly secured thereto, one of said semi-cylindrical members extending radially inwardly into said cylindrical member to provide a longitudinally extending tongue, said shaft having a longitudinal groove, said tongue being receivable in said groove; and a protective sheath covering all external surfaces of said semi-circular members and said cylindrical member.

9. A valve connectible in a flow conductor between fittings thereof having opposed flanges and a plurality of circumferentially spaced securing means connecting said flanges including: a tubular body having a flow passage; a resilient protective seat member covering the interior of said tubular body and having portions extending outwardly on opposite sides of said body; a valve disk mounted in said flow passage for rotation about an axis perpendicular to the central axis of said flow passage and engageable with the protective seat member, said valve having a shaft extending through said body and said protective member, said valve disk being secured to said shaft; said valve disk having protuberances providing convex seat surfaces, said protective covering having concave seal surfaces engageable with said convex seat surfaces of said valve disk for sealing therebetween to prevent flow of fluids to the shaft from said flow passage, said protuberances, said convex seat surfaces, and said concave seal surfaces having a common central axis, said central axis also being the longitudinal axis of said shaft, said concave seal surfaces of said protective covering having radii of curvature, when said protuberances are not engaged with said concave seal surfaces, which are smaller than the radii of curvature of said convex seat surfaces whereby said protective covering is compressed against said body and said shaft by said protuberances when said valve disk is mounted in said flow passage to ensure a fluid tight seal between said surfaces, said outwardly extending portions of said resilient protective seat member being engageable with the flanges of the fitting to provide a fluid-tight seal therebetween, said body having a pair of guide openings for receiving said securing means to position the body properly between said flanges during the installation of the valve body therebetween.

10. In a valve of the type described, a valve disk comprising: a cylindrical member having means provided with a longitudinal slot; semi-circular members extending radially outwardly in opposite directions from said cylindrical sleeve and rigidly secured thereto, one of said semi-cylindrical circular members extending radially inwardly into said cylindrical member through said longitudinal slot to provide a longitudinal tongue receivable in a longitudinal groove of a shaft insertable through said cylindrical member; and a protective sheath covering all external surfaces of said semi-cylindrical members and said sleeve.

11. In a valve of the type described, a valve disk comprising: a cylindrical member having means provided with a longitudinal slot; semi-circular members extending radially outwardly in opposite directions from said cylindrical sleeve and rigidly secured thereto, one of said semi-cylindrical circular members extending radially inwardly into said cylindrical member through said longitudinal slot to provide a longitudinally extending tongue receivable in a longitudinal slot of a shaft extendable through said cylindrical member; and a protective sheath covering all external surfaces of said semi-circular members and said sleeve, said protective sheath having a pair of convex seat surfaces on opposite sides of said sleeve extending in opposite directions outwardly of said disk.

References Cited in the file of this patent

UNITED STATES PATENTS

| | | |
|---|---|---|
| 2,114,168 | Auger | Apr. 12, 1938 |
| 2,740,423 | Stillwagon | Apr. 3, 1956 |
| 2,750,955 | Bredtschneider | June 19, 1956 |
| 2,786,645 | Ralston | Mar. 26, 1957 |
| 2,821,356 | Rand | Jan. 28, 1958 |
| 2,862,685 | Lundberg | Dec. 2, 1958 |
| 2,884,224 | Fawkes | Apr. 28, 1959 |
| 2,923,523 | Taylor | Feb. 2, 1960 |

FOREIGN PATENTS

| | | |
|---|---|---|
| 197,383 | Switzerland | July 16, 1938 |